US007483873B2

(12) United States Patent
Bhattacharjee et al.

(10) Patent No.: US 7,483,873 B2
(45) Date of Patent: Jan. 27, 2009

(54) METHOD, SYSTEM AND ARTICLE OF MANUFACTURE FOR IMPROVING EXECUTION EFFICIENCY OF A DATABASE WORKLOAD

(75) Inventors: Bishwaranjan Bhattacharjee, Yorktown Heights, NY (US); Sam Sampson Lightstone, Toronto (CA); Timothy Ray Malkemus, Round Rock, TX (US); Sriram K. Padmanabhan, San Jose, CA (US); Adam J. Storm, North York (CA); Daniele Costante Zilio, Georgetown (CA)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 11/038,513

(22) Filed: Jan. 18, 2005

(65) Prior Publication Data

US 2006/0161517 A1    Jul. 20, 2006

(51) Int. Cl.
*G06F 7/00* (2006.01)
*G06F 17/30* (2006.01)
(52) U.S. Cl. ............................ 707/2; 707/10; 707/100; 707/101; 707/102
(58) Field of Classification Search .................. 707/10, 707/100–102, 200, 2
See application file for complete search history.

(56) References Cited

U.S. PATENT DOCUMENTS

| 5,758,146 | A | 5/1998 | Schiefer et al. |
| 5,761,653 | A | 6/1998 | Schiefer et al. |
| 5,778,353 | A | 7/1998 | Schiefer et al. |
| 5,802,521 | A | 9/1998 | Ziauddin et al. |
| 5,864,841 | A | 1/1999 | Agrawal et al. |
| 5,956,706 | A | 9/1999 | Carey et al. |
| 6,272,487 | B1 | 8/2001 | Beavin et al. |
| 6,363,371 | B1 | 3/2002 | Chaudhuri et al. |

(Continued)

FOREIGN PATENT DOCUMENTS

EP    1 195 694 A2    10/2002

OTHER PUBLICATIONS

To-Yat Cheung: "A Statistical Model for Estimating the Number of Records in a Relational Database," Informational Processing Letters, vol. 15, Issue 3, pp. 115-118, Oct. 11, 1982.

(Continued)

*Primary Examiner*—John R Cottingham
*Assistant Examiner*—Susan F Rayyan
(74) *Attorney, Agent, or Firm*—Sughrue Mion, PLLC

(57) ABSTRACT

Disclosed is a data processing system implemented method, a data processing system and an article of manufacture for improving execution efficiency of a database workload to be executed against a database. The database includes database tables, and the database workload identifies at least one of the database tables. The data processing system includes an identification module for identifying candidate database tables being identifiable in the database workload, the identified candidate database tables being eligible for organization under a clustering schema, a selection module for selecting the identified candidate tables according to whether execution of the database workload is improved if the selected identified candidate table is organized according to the clustering scheme, and an organization module for organizing the clustering schema of the selected organized identified candidate tables prior to the database workload being execution against the database.

34 Claims, 9 Drawing Sheets

U.S. PATENT DOCUMENTS

| | | | |
|---|---|---|---|
| 6,496,834 B1 * | 12/2002 | Cereghini et al. | 707/102 |
| 6,513,029 B1 | 1/2003 | Agrawal et al. | |
| 2002/0091707 A1 | 7/2002 | Keller | |
| 2003/0126143 A1 | 7/2003 | Roussopoulos et al. | |
| 2003/0212692 A1 * | 11/2003 | Campos et al. | 707/100 |
| 2003/0229617 A1 | 12/2003 | Rjaibi et al. | |
| 2004/0003004 A1 * | 1/2004 | Chaudhuri et al. | 707/200 |
| 2005/0203940 A1 * | 9/2005 | Farrar et al. | 707/102 |
| 2007/0112549 A1 * | 5/2007 | Lau et al. | 703/13 |

OTHER PUBLICATIONS

To-Yat Cheung: "Estimating Block Accesses and Number of Records in File Management," Communications of the ACM, vol. 25, No. 7, pp. 484-487, Jul. 1982.

Surajit Chaudhuri et al.: "Compressing SQL Workloads," ACM SIGMOD 2002, Jun. 4-6, 2002.

Hidetoshi Uchiyama et al.: "A Progressive View Materialization Algorithm," Proceedings of the Second ACM International Workshop on Data Warehousing and OLAP, pp. 36-41, Nov. 2-6, 1999.

Thomas P. Nadeau et al.: "A Pareto Model for OLAP View Size Estimation." IBM Proceedings of the 2001 Conference of the Centre for Advanced Studies on Collaborative Research, pp. 1-13, published by IBM Press, 2001.

Amit Shukla et al..: "Storage Estimates for Multidimensional Aggregates in the Presence of Hierarchies," 10 pages, Proceedings of the VLDB Conference 1996.

Arnd Christian König et al.: "Combining Histograms and Parametric Curve Fitting for Feedback-Driven Query Result-Size Estimation," Proceedings of the 25$^{th}$ VLDB Conference 1999.

Thomas P. Nadeau et al.: "Binominal Multifractal Curve Fitting for View Size Estimation in OLAP," SCI 2001 Proceedings, vol. II, Information Systems, pp. 194-199.

* cited by examiner

| TABLE NAME | BASELINE Size (4K) | EXPERT 1 Size (4K) | Growth (%) | EXPERT 2 Size (4K) | Growth (%) | EXPERT 3 Size (4K) | Growth (%) | ADVISOR 1 Size (4K) | Growth (%) | ADVISOR 2 Size (4K) | Growth (%) |
|---|---|---|---|---|---|---|---|---|---|---|---|
| LINEITEM | 2081040 | 2102928 | 1.05 | 2178560 | 4.69 | 2256352 | 8.42 | 2330448 | 1.98 | 2329712 | 11.95 |
| ORDERS | 443840 | 461968 | 4.08 | 461968 | 4.08 | 443840 | 0.00 | 467040 | 5.23 | 465552 | 4.89 |
| PART | 76240 | 76240 | 0.00 | 76720 | 0.63 | 80480 | 5.56 | 76720 | 0.63 | 83856 | 9.99 |
| PARTSUPP | 319296 | 319296 | 0.00 | 319296 | 0.00 | 319296 | 0.00 | 360032 | 12.76 | 340032 | 6.49 |
| CUSTOMER | 69168 | 9168 | 0.00 | 69408 | 0.35 | 70208 | 1.50 | 70208 | 1.50 | 71680 | 3.63 |
| SUPPLIER | 4096 | 4096 | 0.00 | 4416 | 7.81 | 4096 | 0.00 | 4416 | 7.81 | 4352 | 6.25 |
| Total | 2993680 | 3033696 | 1.34 | 3110368 | 3.90 | 3174272 | 6.03 | 3308864 | 10.53 | 3295184 | 10.07 |

METHOD, SYSTEM AND ARTICLE OF MANUFACTURE FOR IMPROVING EXECUTION EFFICIENCY OF A DATABASE WORKLOAD

FIELD OF THE INVENTION

The present invention relates to a database management system, and more specifically, the present invention relates to a data processing system implemented method, a data processing system, and an article of manufacture for improving execution efficiency of a database workload.

BACKGROUND

Data clustering is a storage methodology in which like or similar data records are grouped together. Multidimensional clustering ("MDC") allows data to be ordered simultaneously along different dimensions. MDC is motivated to a large extent by the spectacular growth of relational data, which has spurred the continual research and development of improved techniques for handling large data sets and complex queries. In particular, online analytical processing (OLAP) has become popular for data mining and decision support. OLAP applications are characterized by multi-dimensional analysis of compiled enterprise data, and typically include transactional queries including group-by and aggregation on star schema and snowflake schema, multi-dimensional range queries, cube, rollup and drilldown.

The performance of multi-dimensional queries (e.g. group-by's, range queries, etc.), and complex decision support queries that typically support a significant number of data records, is often improved through data clustering, as input/output (I/O) costs may be reduced significantly, and processing costs may be reduced modestly. Thus, MDC techniques may offer significant performance benefits for complex workloads.

However, for any significant dimensionality, the possible solution space is combinatorially large, and there are complex design tradeoffs to be made in the selection of clustering dimensions. Thus, a database clustering schema can be difficult to design even for experienced database designers and industry experts. A poor choice of clustering dimensions and coarsification can be disastrous, potentially reducing performance rather than enhancing it and expanding storage requirements and associated costs by orders of magnitude. Conversely, a judicious selection of clustering dimensions and coarsification may yield substantial performance benefits, while limiting storage expansion to an acceptable level.

Thus, what is needed is a more systematic and autonomic approach to designing a database clustering schema.

SUMMARY

In an aspect of the invention, there is provided a data processing system implemented method of directing a data processing system to improve execution efficiency of a database workload to be executed against a database, the database comprising database tables, the database workload identifying at least one of the database tables, the data processing system implemented method comprising: identifying candidate database tables being identifiable in the database workload, the identified candidate database tables being eligible for organization under a clustering schema; selecting the identified candidate tables according to whether execution of the database workload is improved if the selected identified candidate table is organized according to the clustering scheme; and organizing the clustering schema of the selected ranked identified candidate tables prior to the database workload being executed against the database.

In an embodiment, the clustering schema comprises at least one of single-dimensional clustering schema and multi-dimensional clustering schema.

In another embodiment, the selecting comprises: simulating database workload performance based on clustering data points along each of a plurality of candidate clustering dimensions at an estimated finest useful dimension granularity (FUDG) coarsification level.

In another embodiment, the selecting comprises: simulating database workload performance based on clustering data points along each of a plurality of candidate clustering dimensions at one or more multiples of an estimated finest useful dimension granularity (FUDG) coarsification level.

In another embodiment, the data processing system implemented method further comprises: determining the cardinality of each of the plurality of candidate clustering dimensions at the one or more multiples of the FUDG coarsification level.

In another embodiment, the selecting comprises: simulating database workload performance based on clustering data points along each of a plurality of candidate clustering dimensions at an estimated coarsification level; selecting a plurality of coarsification levels; and selecting candidate clustering dimension and coarsification combinations to generate a set of candidate clustering solutions.

In another embodiment, the selecting further comprises: searching the set of candidate clustering solutions to identify a candidate clustering dimension and coarsification combination providing the highest relative performance benefit without exceeding a specified storage expansion constraint.

In another embodiment, the data processing system implemented method further comprises: obtaining cardinality statistics from data points sampled for each candidate clustering dimension and coarsification combination.

In another embodiment, the data processing system implemented method further comprises: sampling a subset of data points from the database as a sample space, such that analysis may be performed on the sample space in lieu of the database.

In another embodiment, the data processing system implemented method further comprises: adjusting the sampling size in dependence upon the number of clustering dimensions used.

In another embodiment, the analysis is performed repeatedly on the sample space in lieu of the database.

In another embodiment, the data processing system implemented method further comprises: obtaining a baseline workload performance in the absence of clustering; and comparing the simulated workload performance to the baseline workload performance.

In another embodiment, the data processing system implemented method further comprises: ordering the set of candidate clustering solutions based on the cardinality statistics.

In another aspect of the invention, there is provided a data processing system for improving execution efficiency of a database workload to be executed against a database, the database comprising database tables, the database workload identifying at least one of the database tables, the data processing system comprising: an identification module for identifying candidate database tables being identifiable in the database workload, the identified candidate database tables being eligible for organization under a clustering schema; a selection module for selecting the identified candidate tables according to whether execution of the database workload is improved if the selected identified candidate table is organized according to the clustering scheme; and an organization module for organizing the clustering schema of the selected ranked identified candidate tables prior to the database workload being executed against the database.

In an embodiment, the clustering schema comprises at least one of single-dimensional clustering schema and multi-dimensional clustering schema.

In another embodiment, the selection module comprises: a simulating module for simulating database workload performance based on clustering data points along each of a plurality of candidate clustering dimensions at an estimated finest useful dimension granularity (FUDG) coarsification level.

In another embodiment, the selection module comprises: a simulating module for simulating database workload performance based on clustering data points along each of a plurality of candidate clustering dimensions at one or more multiples of an estimated finest useful dimension granularity (FUDG) coarsification level.

In another embodiment, the data processing system further comprises: a determining module for determining the cardinality of each of the plurality of candidate clustering dimensions at the one or more multiples of the FUDG coarsification level.

In another embodiment, the selection module comprises: a simulation module for simulating database workload performance based on clustering data points along each of a plurality of candidate clustering dimensions at an estimated coarsification level; a selecting module for selecting: a plurality of coarsification levels; and candidate clustering dimension and coarsification combinations to generate a set of candidate clustering solutions.

In another embodiment, the selecting module comprises: a search module for searching the set of candidate clustering solutions to identify a candidate clustering dimension and coarsification combination providing the highest relative performance benefit without exceeding a specified storage expansion constraint.

In another embodiment, the data processing system further comprises: an obtaining module for obtaining cardinality statistics from data points sampled for each candidate clustering dimension and coarsification combination.

In another embodiment, the data processing system further comprises: a sampling module for sampling a subset of data points from the database as a sample space, such that analysis may be performed on the sample space in lieu of the database.

In another embodiment, the data processing system further comprises: an adjustment module for adjusting the sampling size in dependence upon the number of clustering dimensions used.

In another embodiment, the data processing system further comprises: an obtaining module for obtaining a baseline workload performance in the absence of clustering; and a comparing module for comparing the simulated workload performance to the baseline workload performance.

In another embodiment, the data processing system further comprises: an ordering module for ordering the set of candidate clustering solutions based on the cardinality statistics.

In another aspect of the invention, there is provided an article of manufacture for directing a data processing system to improve execution efficiency of a database workload to be executed against a database, the database comprising database tables, the database workload identifying at least one of the database tables, the article of manufacture comprising: a program usable medium embodying one or more instructions executable by the data processing system, the one or more instructions comprising: data processing system executable instructions for identifying candidate database tables being identifiable in the database workload, the identified candidate database tables being eligible for organization under a clustering schema; data processing system executable instructions for selecting the identified candidate tables according to whether execution of the database workload is improved if the selected identified candidate table is organized according to the clustering scheme; and data processing system executable instructions for organizing the clustering schema of the selected ranked identified candidate tables prior to the database workload being executed against the database.

In an embodiment, the clustering schema comprises at least one of single-dimensional clustering schema and multi-dimensional clustering schema.

In another embodiment, the data processing system executable instructions for selecting comprises: data processing system executable instructions for simulating database workload performance based on clustering data points along each of a plurality of candidate clustering dimensions at an estimated finest useful dimension granularity (FUDG) coarsification level.

In another embodiment, the data processing system executable instructions for selecting comprises: data processing system executable instructions for simulating database workload performance based on clustering data points along each of a plurality of candidate clustering dimensions at one or more multiples of an estimated finest useful dimension granularity (FUDG) coarsification level.

In another embodiment, the data processing system executable instructions for selecting comprises:—data processing system executable instructions for determining the cardinality of each of the plurality of candidate clustering dimensions at the one or more multiples of the FUDG coarsification level.

In another embodiment, the data processing system executable instructions for selecting comprises: data processing system executable instructions for simulating database workload performance based on clustering data points along each of a plurality of candidate clustering dimensions at an estimated coarsification level; data processing system executable instructions for selecting a plurality of coarsification levels; and data processing system executable instructions for selecting candidate clustering dimension and coarsification combinations to generate a set of candidate clustering solutions.

In another embodiment, the data processing system executable instructions for selecting further comprises: data processing system executable instructions for searching the set of candidate clustering solutions to identify a candidate clustering dimension and coarsification combination providing the highest relative performance benefit without exceeding a specified storage expansion constraint.

In another embodiment the article of manufacture further comprises: data processing system executable instructions for obtaining cardinality statistics from data points sampled for each candidate clustering dimension and coarsification combination.

In another embodiment, the article of manufacture further comprises: data processing system executable instructions for sampling a subset of data points from the database as a sample space, such that analysis may be performed on the sample space in lieu of the database.

In another embodiment, the article of manufacture further comprises: data processing system executable instructions for adjusting the sampling size in dependence upon the number of clustering dimensions used.

In another embodiment, the article of manufacture further comprises: data processing system executable instructions for obtaining a baseline workload performance in the absence of clustering; and data processing system executable instructions for comparing the simulated workload performance to the baseline workload performance.

In another embodiment, the article of manufacture further comprises: data processing system executable instructions for ordering the set of candidate clustering solutions based on the cardinality statistics.

These and other aspects of the invention will become apparent from the following more particular descriptions of exemplary embodiments of the invention.

BRIEF DESCRIPTION OF THE DRAWINGS

In the Figures which illustrate exemplary embodiments of the invention:

FIG. 8 is an illustrative example of expansion values for a given illustrative example;

DETAILED DESCRIPTION

An embodiment of the present invention provides a method and system for designing a clustering schema for each table of a database. A database query optimizer is used to evaluate and detect a set of clustering dimensions for a table, initially without consideration as to which clustering dimensions can co-exist in combination or how each should be coarsified (i.e. placed into fewer data cells). For each candidate dimension, a finest useful dimension granularity (FUDG) is estimated based on a storage expansion constraint. This "FUDG" value, as defined in this specification, refers to an estimated point at which granularity (resulting from coarsification) is optimal, any finer granularity resulting in storage expansion exceeding an acceptable amount. Further levels of coarsification are then modeled for each candidate dimension. In an embodiment, sampling data is collected over these candidate dimensions at the various levels of coarsification to better model data cardinality and density. Combinations of dimensions and coarsifications are then examined for data density, data expansion and expected performance benefit. The combinations are important since there can be significant correlations between dimensions, and these correlations vary with the coarsification of the dimensions. The combination with highest workload benefit that satisfies the storage expansion constraint is chosen as the recommended design for a table.

Figure 1:
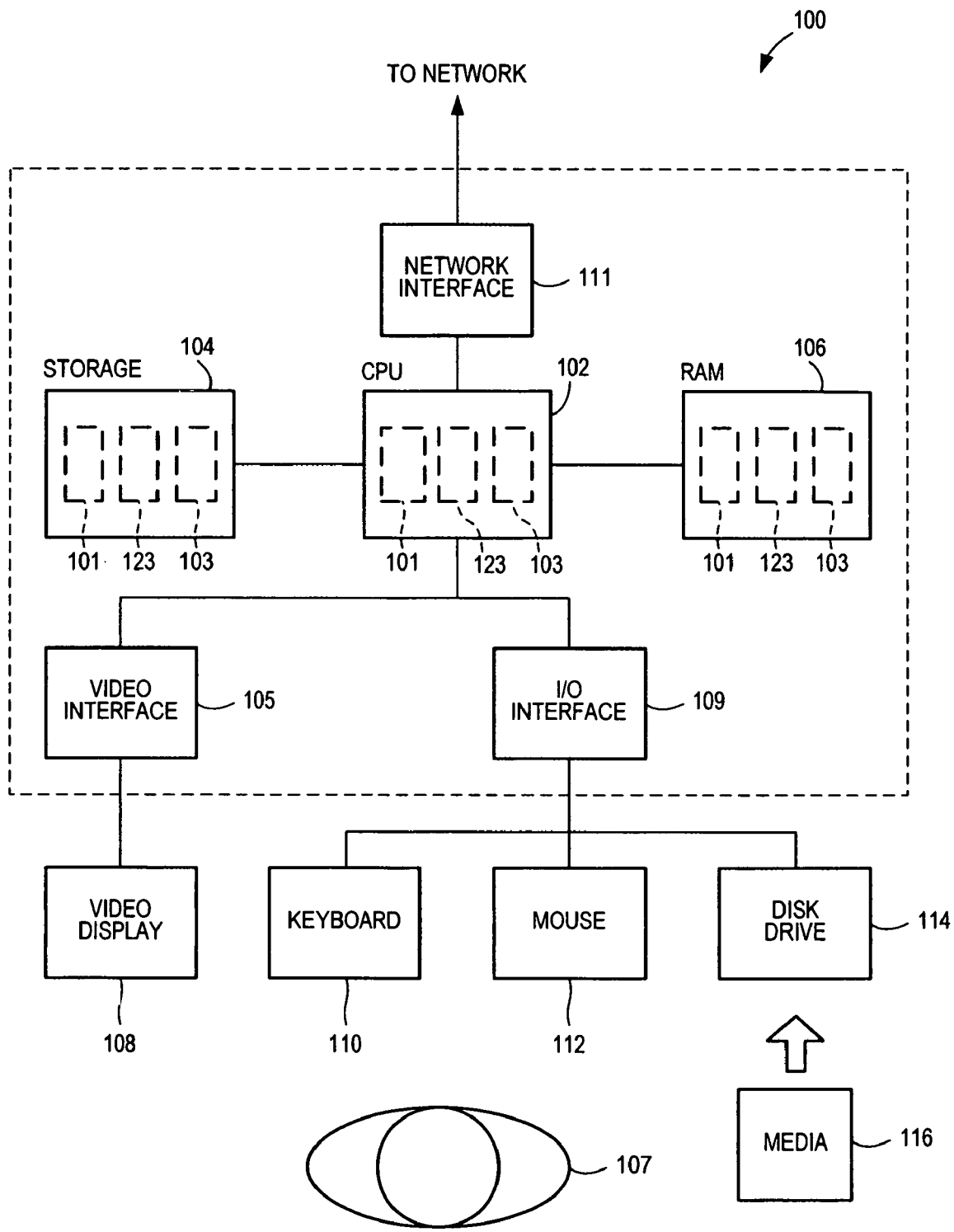
FIG. 1 is a schematic block diagram of a computer system which may provide an operating environment for practicing exemplary embodiments of the invention.

FIG. 1 shows an illustrative computer system 100 that may provide an operating environment for exemplary embodiments of the invention. The computer system 100 may include a central processing unit ("CPU") 102 connected to a storage unit 104 and to a random access memory ("RAM") 106. The CPU 102 may process an operating system 101, application software 103, and a database management system ("DBMS") 123 managing stored data records. The operating system 101, DBMS 123 and application software 103 may be stored in the storage unit 104 and loaded into RAM 106, as required. A user 107 may interact with the computer system 100 using a video display 108 connected by a video interface 105, and various input/output devices such as a keyboard 110, mouse 112, and disk drive 114 connected by an I/O interface 109. The disk drive 114 may be configured to accept computer readable media 116. Optionally, the computer system 100 may be network enabled via a network interface 111. It will be appreciated that the computer system 100 of FIG. 1 is illustrative, and is not meant to be limiting in terms of the type of computer system which may provide a suitable operating environment for practicing the present invention.

Figure 2:
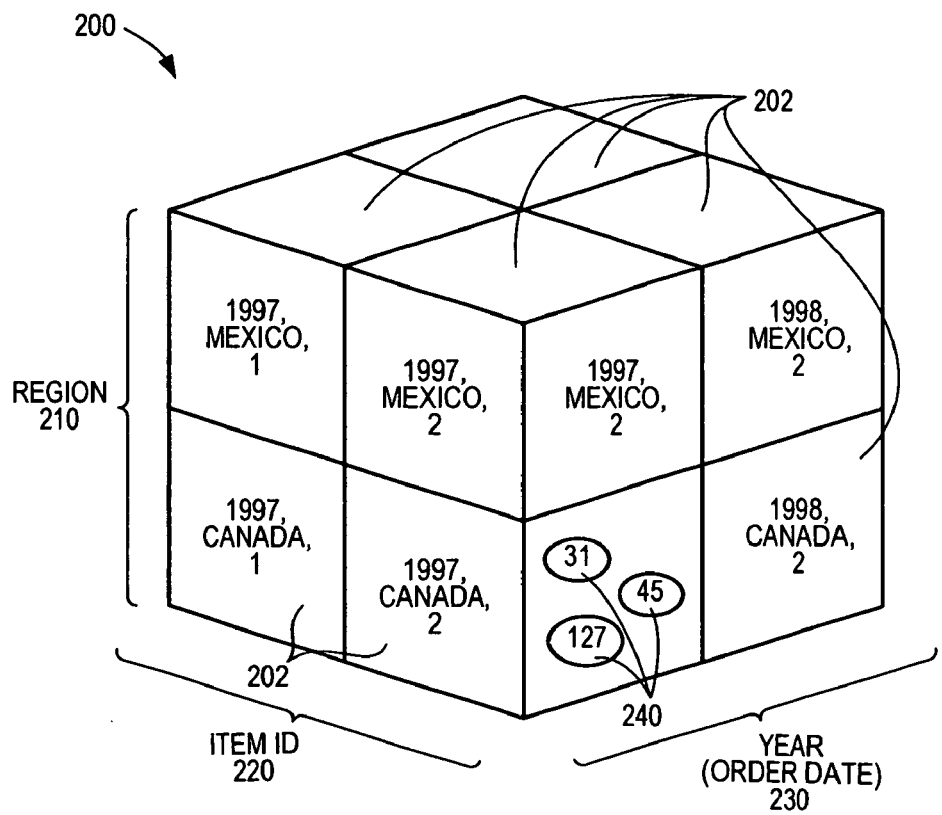
FIG. 2 is an illustrative example of an MDC table clustered along a number of dimensions.

FIG. 2 is an illustrative example of an MDC table 200 clustered along three dimensions. MDC table 200 may illustrate, for example, an MDC table structure created by the MDC implementation in IBM DB2™. In this illustrative example, the dimensions include a "region" 210, "itemId" 220, and "year(orderDate)" 230. MDC table 200 is depicted as a simple logical cube with two values for each dimension attribute. Thus, each cell 202 of FIG. 2 represents a portion of the table having a unique intersection of region 210, itemId 220 and year(orderDate) 230 values. Illustrative data blocks 240 represented as ovals are shown in one of the cells 202 identified by the dimension values "1997, Canada, 2".

Figure 3:
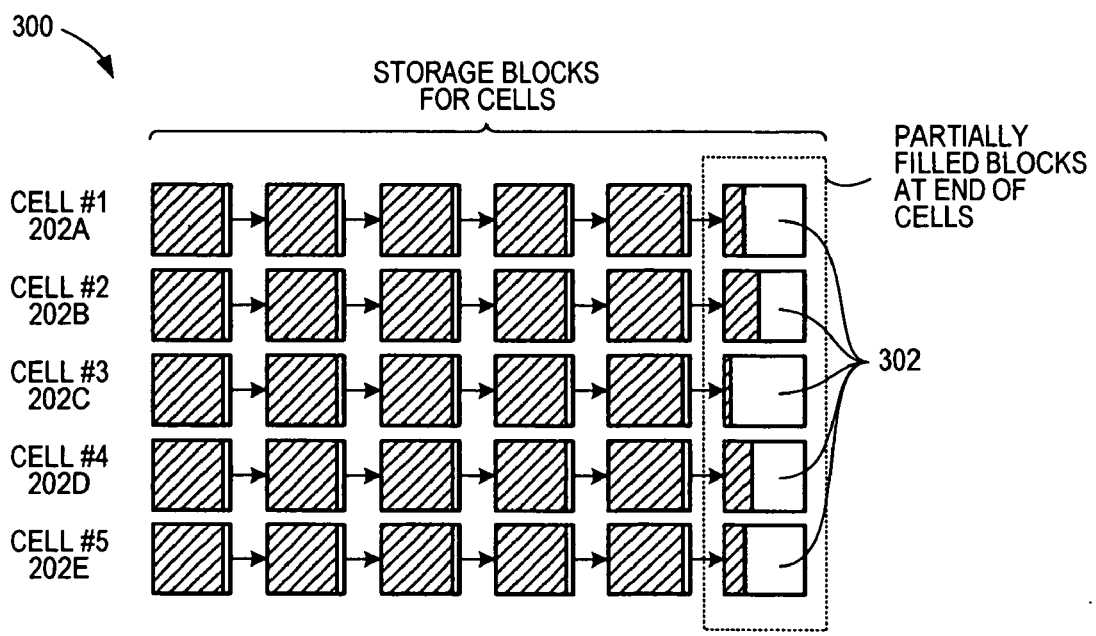
FIG. 3 is a schematic block diagram of an arrangement of storage data blocks for storing data records from each cell.

FIG. 3 is a schematic block diagram of an arrangement 300 of physical storage data blocks for storing data records for each logical cell 202a-202e. As shown, in this illustrative example, the final data blocks 302 in each cell 202a-202e are only partially filled. The fill rate in the last block will be arbitrary, depending on the row width and the number of rows in the cell. For the purposes of the present discussion, it can be assumed that, on average, the fill rate in the final block will be around 50%.

Generally speaking, the greater the number of cells, the greater the number of partially filled blocks, resulting in more wasted space W. An estimate of the wasted space W can be made by assuming each cell contains a single partially filled block at the end of its block list. The space waste is then $W = \eta \text{cells} \cdot P\% \cdot \beta$, where P% is the average percentage of each storage block left empty per cell, and $\beta$ is the block size.

Referring back to FIG. 1, application software 103 may include data processing executable instructions for interacting with DBMS 123 and for execution of various methods in accordance with the teachings of the present invention. The computer executable code may be organized into "modules" for performing various functions. Each module may contain data processing system executable instructions that may be called upon to perform a specific function. Alternatively, the modules may form part of a larger set of data processing system executable instructions that may be compiled collectively.

As an illustrative example, DBMS 123 may comprise IBM DB2 Universal Database™ (UDB) V8.1 with an implementation of MDC. In the DB2 UDB implementation of MDC, each unique combination of dimension values forms a logical cell (e.g. a cell 202 of FIG. 2) which is physically organized as blocks of pages. A block is a set of consecutive pages on a disk. Every page of a table is part of exactly one block, and all blocks of a table consist of the same number of pages. The clustering dimensions are individually indexed by B+ indexes known as dimension block indexes which have dimension values as keys and block identifiers as key data.

The DB2 UDB implementation of MDC can co-exist with other database features such as row based indexes, table constraints, materialized views, high speed load and mass delete. The benefit of these coexistence properties for example allows DB2 to perform index ANDing and index ORing between MDC dimension block indexes and traditional row based (RID) indexes within the same database.

Clustering Dimension Selection Overview

Clustering data along multiple dimensions for the purposes of improving database performance requires the allocation of storage blocks to disk for all cells (unique combinations of dimensions) that have at least one entry or "tuple". Since, in practice, all cells will likely have at least one incompletely filled block (as shown in FIG. 3), clustering will generally cause some storage expansion proportionate to the number of cells having data. Since increased storage can impact system performance, it is treated as a constraint on the selection problem. Specifically, storage should not be allowed to expand without constraint even if further performance benefits may be obtained. With this constraint in mind, a suitable design for a database clustering schema can be sought.

Theoretically, the search space for selecting a clustering solution can be very large. The basic problem of selecting clustering dimensions and coarsification from a finite set can be modeled easily as a simple combination problem. However, since each dimension may have some number of degrees of coarsification, the search space expands exponentially. Assuming an equal number of degrees of coarsification for each dimension, the following equation approximates the number of combinations of "n" dimensions, each with "c" degrees of coarsification:

$$\left(\sum_{r=1}^{n-1} ((n!)/(r!(n-r)!))c^r\right) + c^n \qquad [1]$$

Of course, in practice, not all dimensions will have the same number of degrees of coarsification. Even so, equation [1] gives an indication of the complexity of the potential search space.

Approaches to Database Clustering Schema Design

The general approach to designing a database clustering schema in accordance with an embodiment of the present invention may be summarized as follows:

I. Obtain a baseline of expected workload performance in the absence of clustering.

II. For a given database table, simulate workload performance based on clustering data points along each of a plurality of candidate clustering dimensions, and estimate the expected performance benefit. In an embodiment, this is done at a finest useful dimension granularity or FUDG coarsification level for each dimension (the FUDG coarsification level representing the highest possible number of logical cells which meets a specified storage expansion constraint).

III. For each candidate clustering dimension, select a plurality of coarsification levels, and select candidate clustering dimension and coarsification combinations to generate a set of candidate clustering solutions. In an embodiment, cardinality statistics (i.e. a statistical count of data points in a cell) obtained from sampled data points are analyzed for each candidate clustering dimension and coarsification combination.

IV. Search the set of candidate clustering solutions (comprising dimension(s)/coarsification(s) combinations) to identify a candidate clustering solution providing the highest relative performance benefit without exceeding the specified storage expansion constraint.

V. Repeat II to IV for each table having candidate clustering dimensions. Using IBM DB2 UDB as an illustrative example of DBMS 123, the method is now described in more detail. Note that the "phases" described above and below are used merely for convenience, and are not meant to imply a specific number of steps.

Phase I

Without the benefit of clustering, the expected resource consumption of each query in a workload (i.e. a set of SQL queries) may be simulated to obtain an estimated baseline of workload performance. By way of example, DB2's SQL EXPLAIN facility may be used for this purpose. Any increase in performance over this baseline performance may thus represent a potential benefit of clustering, as discussed below.

Phase II

After estimating a baseline level of performance, each query in the workload may be re-optimized, whereby the SQL optimizer simulates the effect of clustering on each potentially useful candidate clustering dimension.

More particularly, the candidate clustering dimensions may be identified during optimization of SQL queries by identifying the database columns used for predicates or identified with operators, that are likely to benefit from clustering. These operations may include, for example, GROUP BY, ORDER BY, CUBE, ROLLUP, WHERE (for equality and inequality and range), etc.

During this phase, the optimizer is essentially modeling a best-case scenario, where the data is clustered perfectly along each potentially useful clustering dimension. In an embodiment, each clustering dimension is modeled within a query compiler/optimizer at a FUDG coarsification level, as if that dimension is the only clustering dimension used. As noted above, the FUDG coarsification level represents the highest possible number of logical cells (i.e. an upper bound on the granularity of each dimension) that satisfies the specified storage expansion constraint.

Figure 4:
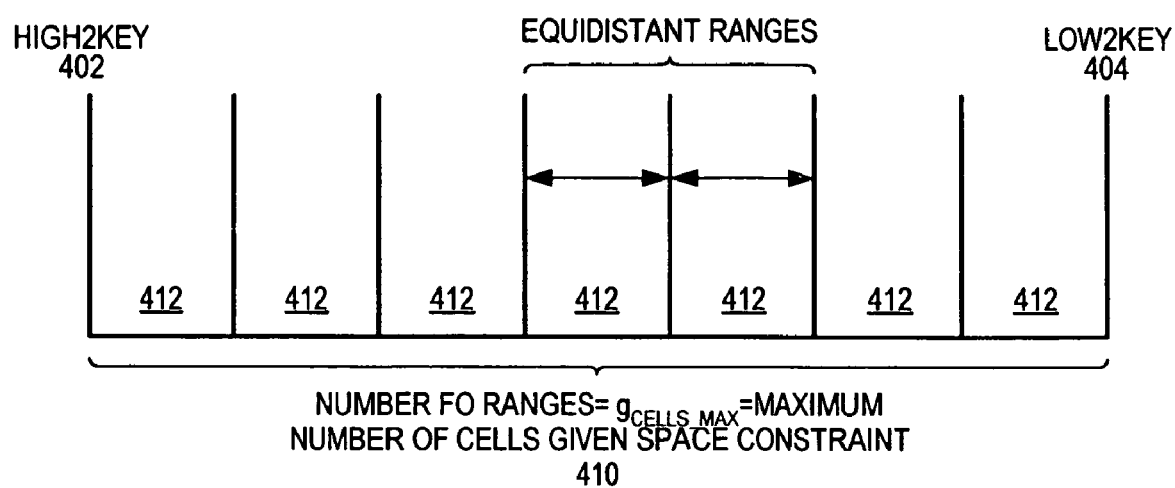
FIG. 4 is a schematic block diagram illustrating the calculation of a dimension coarsification for numeric types.

Referring to FIG. 4, for numeric types of data, the FUDG coarsification for a dimension may be calculated using a HIGH2KEY statistic 402 (second largest column value) and a LOW2KEY statistic 404 (second smallest column value) to define a range 410. A mathematical function can be defined that divides the range 410 between HIGH2KEY 402 and LOW2KEY 404 into a number of ranges 412, where the number of ranges 412 is the same as the maximum number of cells possible in a corresponding table, given a specified storage expansion constraint. More specifically, the FUDG coarsification may be calculated in DB2 as follows:

$$D_{FUDG} = (\text{Column} - \text{LOW2KEY})/\text{iCoarsifier} \qquad [2]$$

where iCoarsifier is . . .

$$\text{iCoarsifier} = ((\text{HIGH2KEY} - \text{LOW2KEY})/\text{iNum\_b-locks\_min}); \qquad [3]$$

and iNum_blocks_min is . . .

$$\text{iNum\_blocks\_min} = \text{MAX}(1, \text{table\_size}/S); \qquad [4]$$

In equation [4] above, "table_size" is the size of the table being evaluated for MDC, and S is the size of the storage blocks in the cell-block model for the table. This defines the FUDG coarsification for numeric types. Further coarsification levels may be obtained by multiplying iCoarsifier by powers of 2, or powers of 4. For example, in an embodiment, iCoarsifier may be multiplied by powers of 2, and various coarsification levels may be considered.

For characters types (e.g. CHARACTER, VARCHAR, GRAPHIC, VARGRAPHIC), coarsification may be achieved by using a subset of bytes. For example, a STATE/PROVINCE dimension could be coarsified to less than 24 cells by clustering on the first character of the STATE/PROVINCE string.

In order for the above equations to apply, numeric type dimension values should be converted to integer form (e.g. the fraction portion may be truncated) so that the cardinality of the resulting range is discrete. For real types (e.g. DECIMAL, FLOAT, DOUBLE) this means ensuring they have a substantial positive range to handle the cases where a significant number of the values in the range have a value between 1 and −1. To accomplish this, the FUDG coarsification for Real types may include a multiplicative factor that ensures that HIGH2KEY 402 is >1000.

For other types of dimensions such as DATE and TIMESTAMP, it is possible to coarsify these dimensions by their natural hierarchies (e.g. day→week→month→quarter→year) by converting the date field to an integer type, and applying integer division may be used to coarsify. Thus, for example, seven cells each representing a day could be coarsened to one cell representing a week. When dealing with only a small range of data values for modeling purposes, special assumptions may be made when determining the FUDG coarsification for such dimensions as DATE and STAMP. For example, for both TIMESTAMP and DATE, one can assume that WEEK of YEAR is a reasonable estimate of FUDG, since it coarsifies the column to a maximum of 52 cells per year. Such an assumption may not be required for a sufficiently large range of data values on a real life system.

Contrasting the baseline results obtained earlier with the results obtained from clustering at the FUDG coarsification, an estimate of the benefit gained by clustering on each candidate dimension may be obtained.

An alternative to equations [2] to [4], above, for calculating the FUDG coarsification in DB2 is as follows:

$$D_{FUDG}=(\text{Column—LOW2KEY})/i_{Coarsifier} \quad [2a]$$

where iCoarsifier is . . .

$$i\text{Coarsifier}=((HIGH2KEY-LOW2KEY)/\text{Max\_buckets}); \quad [3a]$$

and Max_buckets is . . .

$$\text{Max\_buckets}=\text{Max\_wasted\_pages}/(\text{blocksize}*P\%*1.2) \quad [4a]$$

And Max_wasted-pages is . . .

$$\text{Max\_wasted\_pages}=(\text{table\_size}*\text{expansion\_constraint})-\text{table\_size} \quad [4b]$$

In the above equation 4a, as noted earlier, P % is the average percentage of each storage block left empty per cell. The 1.2 factor, indicating 20% growth, is used to expand the range slightly to account for sparsity (i.e. unused cells) in the range of the dimension. Other factors may also be used.

Phase III

For each candidate dimension, once the benefits of clustering at the FUDG coarsification have been estimated as described above, the benefits for each candidate dimension may then be estimated at various other levels of coarsification, as explained below.

Given the potential size of a database, there may be many combinations of dimensions and coarsifications to evaluate. With a small number of candidate dimensions (one or two) it may be possible to perform an exhaustive search. However, with higher dimensionality, and a higher degree of coarsification, such a search can be prohibitive. In this case, a sampling approach may be applied using algorithms for estimating the cardinality (i.e. a count of unique values in a set) of a sample.

For a discussion on sampling and extrapolation algorithms, see Haas, P. J., Naughton, J. F., Seshadri, S., Stokes, L., "Sampling Based Estimation of the Number of Distinct Values of an Attribute", VLDB 1995; and Haas, P. J., Stokes, L., "Estimating the number of classes in a finite population", JASA, V. 93, December, 1998, both of which are incorporated herein by reference. Generally speaking, the algorithms for estimating the cardinality, or the number of unique values in a set, can be divided in to two main categories: i) those that evaluate cardinality while examining the frequency data in the sample, and ii) those that generate a result without considering frequency distribution across classes in the sample. A suitable algorithm is the First Order Jackknife estimator can be described as follows:

When a data set contains no skew, a scale-up factor, defined as Scale=D/E[d], is given by $$\text{Scale}=D/E[d]=1/(1-(1-q)^{(N/d)}) \quad [5]$$

Here, D is the number of distinct values in the set and d is the number of distinct values in the sample. Also, E[d] is the expected number of distinct values in the sample under Bernoulli sampling with rate q=n/N, where n is the sample size and N is the set size.

E[d] is the theoretical expected value of d, i.e., the average value of d over many repeated samples. The idea behind the "method of moments" estimator is to derive an equation relating E[d] to D, based on theoretical considerations. From the above equation, D can be solved to get a relation of the form:

$$D=f(E[d]) \quad [6]$$

for some function f. An estimator D' is then obtained by substituting d for E[d] in the above relation:

$$D'=f(d) \quad [7]$$

Such a substitution is reasonable if the sample is not too small. E[d] is the "first moment" of d, so a moment is replaced by an observed value.

It will be appreciated that any one of a number of different estimators other than the First Order Jackknife estimator may also be used.

Figure 5:
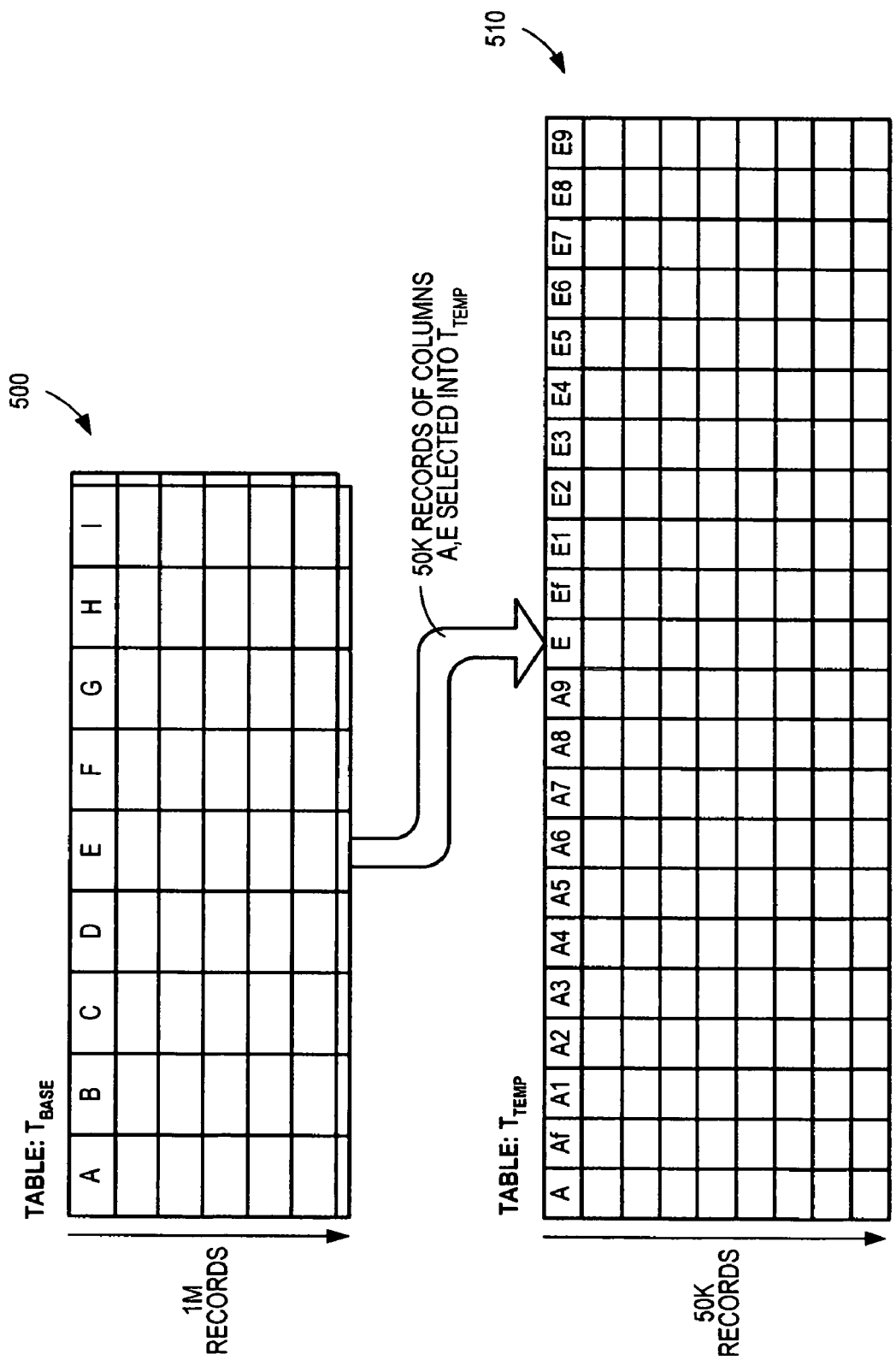
FIG. 5 is a schematic diagram illustrating data records being sampled from a database table.

To facilitate sampling, as shown by way of illustration in FIG. 5, a target number of data points may be sampled from a table 500, and placed in a staging table 510. Cardinality estimation research performed by Haas et al. (referenced above) suggests that the accuracy of statistical cardinality estimators drop off precipitously when sampling rates fall below 1%. Therefore, in this illustrative example, the staging table 510 uses a sample of 50,000, which represents a 5% sample.

In this illustrative example, staging table 510 includes sampled data points from base columns (e.g. column A and column E) from table 500 that are candidate clustering dimensions. In addition, staging table 510 includes additional columns (e.g. Af, A1, . . . A9; Ef, E1, . . . E9) representing various levels of coarsification to be considered for each candidate clustering dimension. Here, Af and Ef represent the FUDG coarsification level, and subsequent coarsification levels are incrementally more coarse.

Rather than containing absolute values, each of the columns Af, A1, . . . A9, and Ef, E1, . . . E9, may be expression based. For example, if base column A is SALARY containing 50,000 salary data points, a FUDG coarsification, SALARYf=SALARY/100, may appear in column Af. Also, other possible coarsification levels to be considered may include SALARYf/2 (column A1), SALARYf/4 (column A2), . . . etc. In this illustrative example, SALARYf=SALARY/100 will coarsify the 50,000 salary data points into 500 cells (e.g. 500 salary ranges). Similarly, SALARYf/2 will coarsify the salary values into 250 cells, SALARYf/4 will further coarsify the salary values into 125 cells, and so on.

By generating a staging table 510 with various levels of coarsification as described above, the cardinality statistics for dimension and coarsification combinations can be obtained after extracting the sample data points only once from table 500. Any results obtained from staging table 510 may then be extrapolated back to table 500 using the First Order Jackknife estimator, as explained above.

While the base table 500 may itself be scanned many times, significant performance benefits accrue from scanning only the staging table 510, which is a small fraction of the size of the base table 500 from which its data is derived.

Figure 6:
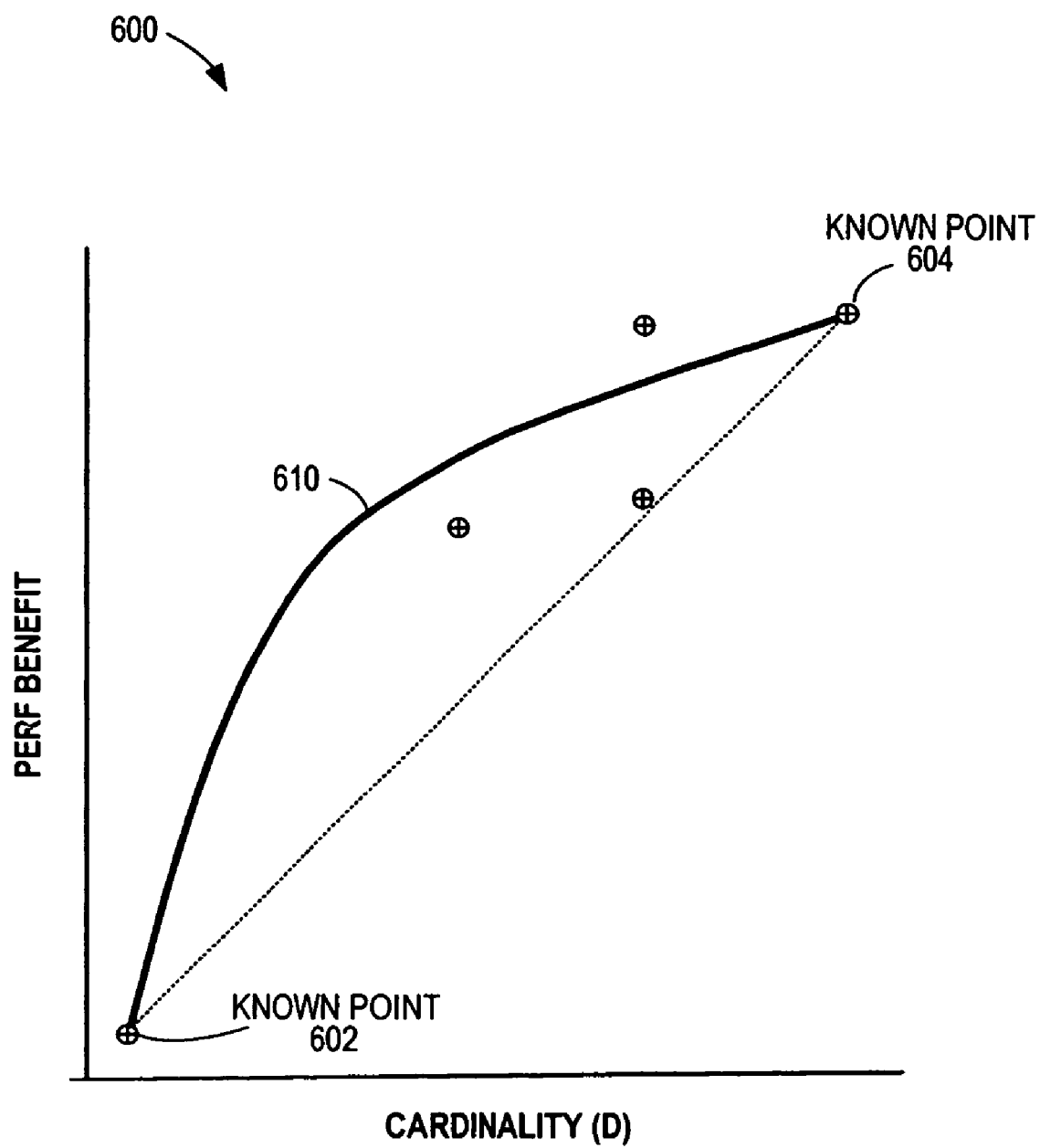
FIG. 6 is a schematic block diagram of an illustrative fitted curve for modeling coarsification performance tradeoffs.

Referring to FIG. 6, a suitable coarsification benefit function may be modeled based on the following two observations: (1) When a database table has only one cell (e.g, all 50,000 data points from staging table 510 of FIG. 5 fall in one cell) there is no clustering, and thus there is no benefit; (2) The expected benefit at the FUDG coarsification has been determined through simulation, and the cardinality at the FUDG point is known (or estimated). This provides two points of reference on a "performance" versus "cardinality of distinct values" graph: a first point 602 where cardinality is 1 (i.e. zero benefit); and a second point 604 where the cardinality is at the FUDG coarsification-level. It is also assumed that the benefit due to clustering is monotonic and decreases as coarsification increases (i.e. as the number of cells decreases). Although the exact shape of the monotonic curve can't be easily determined, one suitable model is a smooth logarithmic relationship, such that the penalty for coarsifying a dimension is initially minor, but increases dramatically as coarsification increases. A curve fitting process may be applied to plot a concave polynomial between points 602 and 604 to derive a benefit-coarsification function as represented by curve 610. With this approach, it is possible to model the performance benefit of any coarsification level of a candidate dimension, given its cardinality of cells.

The benefit versus cardinality of cells function is then determined as follows:

$$B = m * \log(C) \quad [8]$$

$$m = Bf/(\log(Cf)) \quad [9]$$

Here, B is the performance benefit at a given coarsification level, and C is the cardinality of cells at the same coarsification level. Bf is the performance benefit at the FUDG coarsification and Cf is the cardinality of cells at the FUDG coarsification level for the dimension. In the present illustrative example, a logarithmic curve fitting process was used. However, other shapes may also be used, including a straight line. Alternatively, the benefit at each coarsification could be simulated directly, although this may have an unacceptable cost in terms of system performance.

As will be appreciated, the above process allows: (a) detection of candidates for clustering; and (b) modeling their benefit at different levels of coarsification. From this, building blocks are formed to begin to explore combinations of these dimensions at various coarsification levels.

Phase IV

In this phase, the set of potential solutions generated by the previous phase is searched to identify a solution that provides the greatest performance benefit, while meeting a specified storage expansion constraint. More specifically, the set of potential solutions identified includes combinations of all dimensions and their coarsifications. For example, if there are two dimensions (e.g. A and B) with two coarsification levels each (e.g. Af, A1, Bf, B1), then the candidate solution set is: (Af, Bf), (Af, B1), (Af), (A1, Bf), (A1, B1), (A1), (Bf), (B1).

Even after sampling and generating a staging table 510 (FIG. 5), the potential solution set for a combination of candidate clustering dimensions and coarsifications may still be very large. If so, in order to increase efficiency, a subset of the possible solutions may be considered. However, it will be understood that the entire set may also be considered.

To increase the likelihood of finding an optimal combination of dimensions and coarsifications that satisfies the storage expansion constraint, a weighted randomized search may be used to consider possible solutions in probabilistic proportion to their relative potential benefit to the workload. The set of candidate clustering solutions thus generated may then be ranked using cardinality statistics. In an embodiment, for simplicity, the benefit of each clustering solution is assumed to be the sum of the workload benefit for each dimension in the solution.

Other known search schemes may also be used, including any one of random, exhaustive, simulated annealing, genetic algorithm, and neural network.

In an embodiment, a reasonable estimation of the expected benefit of each candidate clustering solution may be calculated by summing the benefits of the clustered dimensions. Once the candidate clustering solutions are generated and ranked based on expected benefit, they may be evaluated in rank order to determine whether they satisfy the specified storage expansion constraint. By way of example, this evaluation may be done by measuring the cardinality of a cell of a candidate from the sample table. For example, if there are 59 unique combinations of the candidate, this number may be used to extrapolate to the estimated number of unique cells in the entire base table. Again, the First Order Jackknife estimator or another suitable estimator can be used.

In an embodiment, the candidate clustering keys may be sorted in rank order (based on the estimated benefit), and the first candidate key to pass the test for storage expansion may be chosen as the final clustering recommendation for a given table.

To improve the efficiency of the search, when a candidate key is encountered that indicates its design will lead to gross storage expansion (e.g. greater than 500% storage growth), in addition to rejecting that solution, its near neighbours in the search constellation may also be eliminated. This near-neighbour reduction has been found to be effective in high dimensionality search spaces in greatly reducing the search cost.

Experimental Results

To validate the above process, a clustering schema solution developed in accordance with the teachings of the present invention was evaluated against a number of other proposed solutions.

The TPC-H industry standard was used to measure relative performance. As known to those skilled in the art, the TPC-H benchmark standard defines a schema and a set transactions for a decision support system. The benchmark is described by the Transaction Processing Performance Council as follows:

"The TPC Benchmark™H (TPC-H) is a decision support benchmark. It consists of a suite of business oriented ad-hoc queries and concurrent data modifications. The queries and the data populating the database have been chosen to have broad industry-wide relevance. This benchmark illustrates decision support systems that examine large volumes of data, execute queries with a high degree of complexity, and give answers to critical business questions."

The performance metric reported by TPC-H is commonly known as the TPC-H Composite Query-per-Hour Performance Metric (QphH@Size), and reflects multiple aspects of the capability of a database management system to process queries. These aspects include the selected database size against which the queries are executed, the query processing power when queries are submitted by a single stream, and the query throughput when queries are submitted by multiple concurrent users. The TPC-H Price/Performance metric is commonly expressed as $/QphH@Size.

Using a 10 GB TPC-H benchmark database running in IBM DB2 UDB v8.1, six experimental tests were considered:

I. Baseline: The performance of the TPC-H benchmark without MDC. This represents a baseline performance.

II. Advisor 1: The performance of the TPC-H benchmark using the best solution selected in accordance with an embodiment of the present invention.

III. Advisor 2: The performance of the benchmark using a second best solution selected in accordance with an embodiment of the present invention.

IV. Expert 1: A multidimensional clustering design created by a DB2 performance benchmarking team. Here, the MDC design was constrained to exclusively clustering on base dimensions (coarsification was not permitted).

V. Expert 2: An MDC schema design provided by the IBM DB2 MDC development team.

VI. Expert 3: An alternate MDC design provided by the IBM DB2 MDC development team.

In all of the above six experimental tests, a 10 GB TPC-H database was fully recreated for each tested multidimensional clustering design, and the TPC-H workload was executed three times to minimize variability in the result. The shortest run for each design is reported, though execution time variability was found to be quite minimal between the three runs at generally less than 2%.

Implementation

A prototype was developed for use with IBM DB2 UDB v8.1, which features MDC technology based on a cell-block allocation model.

In order to enable the dimension/coarsification evaluation function as described above, it was necessary to modify the table statistics and DDL for a candidate table so that the database optimizer would evaluate plans on the assumption that the table was clustered in a fashion consistent with each test. Specifically, four table statistics within IBM DB2 UDB v8.1 required modification:

1) CLUSTER_RATIO: This is a measure, for each table index, of how well the table data is clustered (laid out on disk) in relation to the sequence in the index.

2) NPAGE: This is a measure of the number of pages in the base table.

3) FPAGES: This is a measure of the number of unused (free) pages in the base table.

4) ACTIVE_BLOCKS: This represents the number of storage

More specifically, these four statistics were modeled as follows:

1) Cluster Ratio

The cluster ratio for indexes on clustering dimensions is assumed to be 100%. For other indexes that exist on the table, the clustering ratio is left unchanged. This is a relatively crude approximation, since the multidimensional clustering scheme is certain to affect disk layout, and thus alter cluster ratios for RID indexes.

2) NPAGE

The number of tuples in the table does not change through conversion to any MDC design. However, as data is divided into cells, the number of partially used pages increases linearly with the cell count. Thus NPAGE may be estimated as the summation of NPAGE before MDC, and the expected number of MDC cells, provided that the NPAGE statistic for the pre-MDC image of the table is available:

$$NPAGE_{MDC} = NPAGE_{pre-MDC} + \eta cells$$

3) FPAGES

This can be modeled as the total table size included space waste (empty pages). The calculation for space waste was given above. FPAGES can then be estimated as the sum of NAPGES and space waste:

$$FPAGE_{MDC} = NPAGE_{MDC} + (\eta cells \cdot P\% \cdot \beta)$$

4) Active Blocks

It was assumed that all storage blocks in a table are in use (though blocks may contain some empty pages). This is generally a true statement for a recently populated table. The number of active blocks can be estimated by estimating the page space required for the table independent of any clustering scheme, and adding this to the page space waste, as modeled above, and dividing by the blocking size. The table size prior to MDC conversion is presumed to be known via the FPAGEpre-MDC statistic:

$$\eta blocks = (FPAGE_{MDC} + 1)/B$$

Test System

The test system used was IBM DB2 UDB v 8.1 implementation of MDC. As known to those skilled in the art, IBM DB2 uses a cell-block model to implement MDC, where blocks are indexed using a B+ storage tree. Each block represents a collection of storage pages. The block size in IBM DB2 is an attribute of the "tablespace" containing the storage objects (tables, indexes etc), and can be set by the user during creation of the tablespace. A tablespace is a collection of database objects associated with storage media. The IBM DB2 implementation of MDC requires a minimum of one block per cell if the cell contains any records. Empty cells consume no storage.

Additionally, IBM DB2 incorporates a cost based query optimization scheme, which enables the use of a cost model as an evaluation function for the MDC clustering solution search scheme.

The experiments were performed on a server with the following characteristics: IBM pSeries™ server; AIX™ 5.1; RAM 8 GB; CPUs: 4×375 MHz.

Identical database configurations were used for all 6 experiments. IBM DB2 UDB v8.1 was used, with the modifications described above. The database configuration for IBM DB2 was as follows (Memory allocations are in units of 4 KB pages):

Values for Database Manager Configuration

| Description | Parameter = Value |
| --- | --- |
| Application support layer heap size (4 KB) | (ASLHEAPSZ) = 15 |
| No. of int. communication buffers(4 KB) | (FCM_NUM_BUFFERS) = 512 |
| Enable intra-partition parallelism | (INTRA_PARALLEL) = NO |
| Maximum query degree of parallelism | (MAX_QUERYDEGREE) = ANY |
| Max number of existing agents | (MAXAGENTS) = 200 |
| Agent pool size | (NUM_POOLAGENTS) = 100 (calculated) |
| Initial number of agents in pool | (NUM_INITAGENTS) = 0 |
| Max requester I/O block size (bytes) | (RQRIOBLK) = 32767 |
| Sort heap threshold (4 KB) | (SHEAPTHRES) = 20000 |

Values for Database Configuration

| Description | Parameter = Value |
| --- | --- |
| Buffer pool memory | (BUFFPAGE) = 160000 |
| Max appl. control heap size (4 KB) | (APP_CTL_HEAP_SZ) = 2048 |
| Max size of appl. group mem set | (4 KB)(APPGROUP_MEM_SZ) = 20000 |
| Default application heap (4 KB) | (APPLHEAPSZ) = 256 |
| Catalog cache size (4 KB) | (CATALOGCACHE_SZ) = (MAXAPPLS*4) |
| Changed pages threshold | (CHNGPGS_THRESH) = 60 |
| Database heap (4 KB) | (DBHEAP) = 1200 |
| Degree of parallelism | (DFT_DEGREE) = 8 |
| Default tablespace extentsize (pages) | (DFT_EXTENT_SZ) = 32 |
| Default prefetch size (pages) | (DFT_PREFETCH_SZ) = 32 |
| Default query optimization class | (DFT_QUERYOPT) = 7 |
| Max storage for lock list (4 KB) | (LOCKLIST) = 100 |
| Log buffer size (4 KB) | (LOGBUFSZ) = 128 |
| Log file size (4 KB) | (LOGFILSIZ) = 16384 |
| Number of primary log files | (LOGPRIMARY) = 20 |
| Number of secondary log files | (LOGSECOND) = 60 |
| Max number of active applications | (MAXAPPLS) = 40 |
| Percent. of lock lists per application | (MAXLOCKS) = 10 |
| Group commit count | (MINCOMMIT) = 1 |
| Number of asynchronous page cleaners | (NUM_IOCLEANERS) = 10 |
| Number of I/O servers | (NUM_IOSERVERS) = 10 |
| Package cache size (4 KB) | (PCKCACHESZ) = (MAXAPPLS*8) |
| Percent log file reclaimed before soft chckpt | (SOFTMAX)=100 |
| Sort list heap (4 KB) | (SORTHEAP) = 10000 |
| SQL statement heap (4 KB) | (STMTHEAP) = 8192 |
| Statistics heap size (4 KB) | (STAT_HEAP_SZ) = 5000 |
| Utilities heap size (4 KB) | (UTIL_HEAP_SZ) = 100000 |

MDC Advisor Parameters

The MDC design algorithm was implemented according to the design described above. Specifically, two changeable parameters, sampling rate and space constraint, were implemented at 1% and 10% respectively. (Note that these parameter values are illustrative only and that other parameter values may be used that are suitable under the circumstances.)

Experimental Results

The six MDC designs described above were executed on the subject 10 GB TPC-H database. The clustering designs used in these experiments were the following:

I. Baseline:

No MDC was used. Single dimensional clustering was performed along the following dimensions of TPCH tables (other indexes clustered by less than 5% not shown).

| Index name | Base table | Columns (clustering solution parts) | Cluster quality (%) |
| --- | --- | --- | --- |
| L_OK | LINEITEM | +L_ORDERKEY | 100 |
| R_RK | REGION | +R_REGIONKEY | 100 |
| S_NK | SUPPLIER | +S_NATIONKEY | 36.8 |
| PS_PK_SK | PARTSUPP | +PS_PARTKEY + PS_SUPPKEY | 100 |
| S_SK | SUPPLIER | +S_SUPPKEY | 100 |
| PS_PK | ARTSUPP | +PS_PARTKEY | 100 |

II. Advisor 1:

| Base table | MDC dimensions |
| --- | --- |
| CUSTOMER | C_NATIONKEY,C_MKTSEGMENT |
| LINEITEM | (INT(L_SHIPDATE))/7, L_RETURNFLAG, (INT(L_RECEIPTDATE))/14, L_SHIPINSTRUCT |
| ORDERS | (INT(O_ORDERDATE))/7, O_ORDERSTATUS |
| PART | P_SIZE |
| PARTSUPP | (((PS_PARTKEY)/(((1999999 −2)/(19956))*(8)))) |
| SUPPLIER | S_NATIONKEY |

III. Advisor 2:

| Base table | MDC dimensions |
| --- | --- |
| CUSTOMER | C_NATIONKEY/2, C_MKTSEGMENT |
| LINEITEM | (INT(L_SHIPDATE))/14, L_RETURNFLAG, (INT(L_RECEIPTDATE))/7, L_SHIPINSTRUCT |
| ORDERS | (INT(O_ORDERDATE))/14, O_ORDERSTATUS |
| PART | P_SIZE/2, P_CONTAINER |
| PARTSUPP | (((PS_PARTKEY)/(((1999999 −2)/(19956))*(16)))) |
| SUPPLIER | S_NATIONKEY/2 |

IV. Expert 1:

| Base table | MDC dimensions |
| --- | --- |
| CUSTOMER | |
| LINEITEM | L_SHIPDATE |
| ORDERS | O_ORDERDATE |
| PART | |
| PARTSUPP | |
| SUPPLIER | |

V. Expert 2:

| Base table | MDC dimensions |
|---|---|
| CUSTOMER | C_NATIONKEY |
| LINEITEM | (INT(L_SHIPDATE))/100, L_SHIPMODE, L_SHIPINSTRUCT |
| ORDERS | O_ORDERDATE |
| PART | |
| PARTSUPP | |
| SUPPLIER | S_NATIONKEY |

VI. Expert 3:

| Base table | MDC dimensions |
|---|---|
| CUSTOMER | C_NATIONKEY,C_MKTSEGMENT |
| LINEITEM | (INT(L_SHIPDATE))/100, L_SHIPMODE, L_SHIPINSTRUCT, (INT(L_RECEIPTDATE)/10000 |
| ORDERS | |
| PART | P_SIZE, P_BRAND |
| PARTSUPP | |
| SUPPLIER | |

Solution Search Space

Figure 7A:
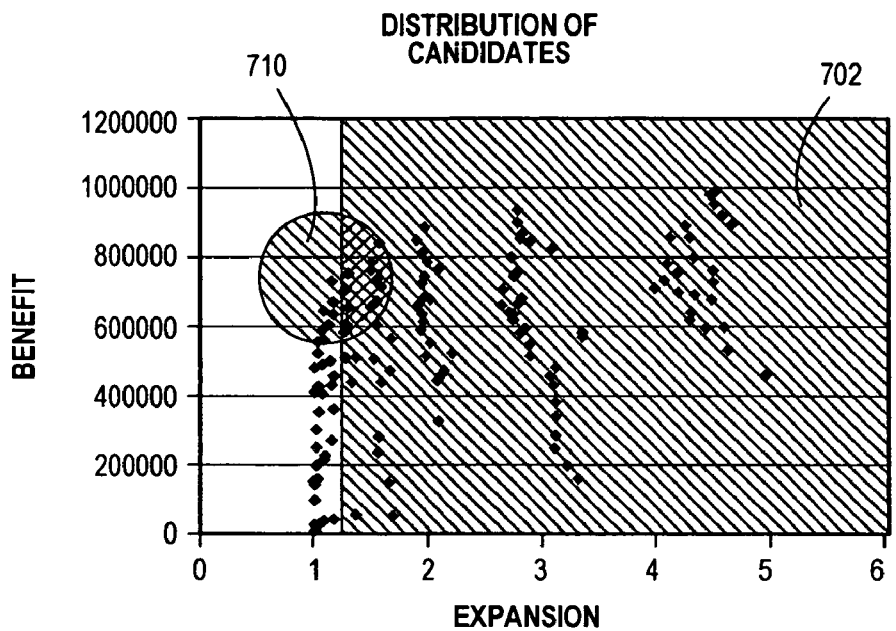
FIG. 7A is an xy graph showing a distribution of clustering dimension candidates.
Figure 7B:
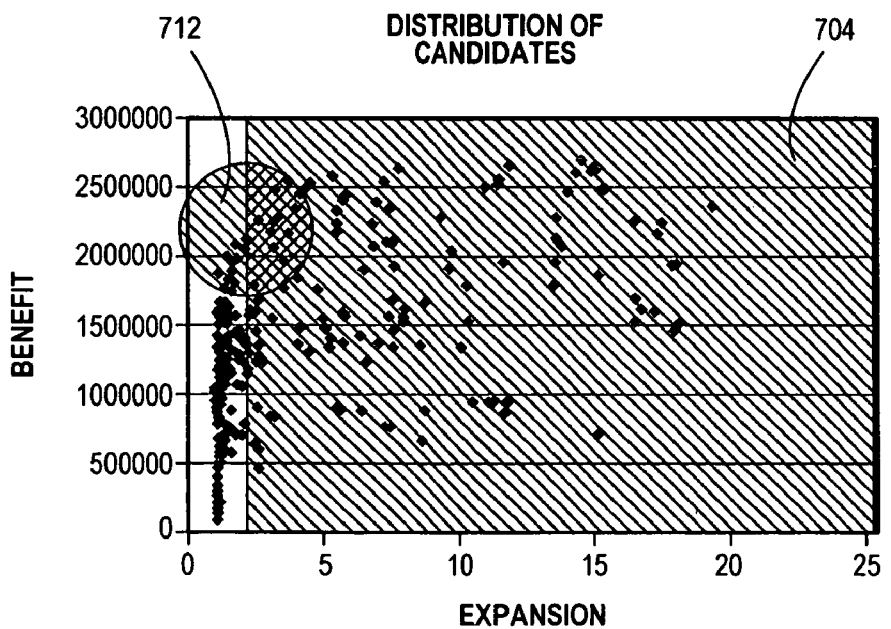
FIG. 7B is an xy graph showing a distribution of clustering dimension candidate/coarsification combinations.

A graphical display of search points considered by the MDC advisor algorithm for two TPC-H tables, LINEITEM and ORDERS illustrates some interesting search characteristics. FIG. 7A and FIG. 7B show the distribution of search points for these tables.

The shaded areas 702, 704 covering the rightmost portions of the space in each of FIG. 7A and FIG. 7B are areas where the search points would have caused table storage expansion exceeding the defined cost constraints. These high storage expansion candidates are not practical as solutions for two reasons: first because the expansion of space at this level would be impractical for most real applications, multiplying storage requirements and costs by several factors beyond a specified storage expansion constraint (e.g. 10%). Second, the clustering benefit for each search point was modeled based on a rather modest storage expansion of the table objects. Once the storage expansion grows dramatically beyond this model, it would be unreasonable to assume that the estimated benefits will still apply. For these two reasons, search points that exceed the storage constraint are rejected from the candidate solution set.

However, more significantly, what appears in FIG. 7A and FIG. 7B is the density of search points that lie along a region in the "x" domain between about 1.0x and 1.2x expansion. The search points near the center of the circled areas 710, 712 represent the best clustering solution candidates, as the performance benefit is relatively high, while the cost in terms of storage expansion is below the specified cost threshold.

MDC Table Expansion

Since constraining table expansion was a major design consideration in the selection of MDC designs, it is significant to examine the expansion rates for tables with each of the MDC designs studied above. By way of illustration, FIG. 8 shows a table 800 with actual expansion rates for the TPC-H tables (LINEITEM, ORDER, PART, PARTSUPP, CUSTOMER, SUPPLIER) that were clustered after applying each of the six clustering designs (Expert 1, Expert 2, Expert 3, Advisor 1, Advisor 2).

Table Expansion with MDC

A few interesting observations are evident from the table expansion data in FIG. 8. First, the process for selecting an MDC schema design in accordance with the teachings of the present invention, which in this illustrative example had a space constraint goal of 10% expansion, was actually quite effective at selecting MDC design that were constrained to that goal. Despite a sampling rate of only 1% using the first order jackknife estimator, the largest table expansion was seen in the Advisor 1 experiment, where the LINEITEM table expanded by 11.98%, and the PARTSUPP table expanded by 12.76%. This is quite reasonable given the 1% sampling rate.

The second observation is that the expert designs by human designers (i.e. Expert 1, Expert 2 and Expert 3) were generally more aggressive than the MDC advisor in constraining space expansion. These human experts were also effective in achieving this goal (1.34%, 3.90% and 6.03% total expansion respectively)—a task that has generally been found quite difficult for non-expert human designers when using MDC. The effectiveness of these human experts is likely a reflection of their deep knowledge and many years of experience with the TPC-H workload. It is unlikely that similar results would be obtained by non-expert human designers.

Performance Results

Figure 9:
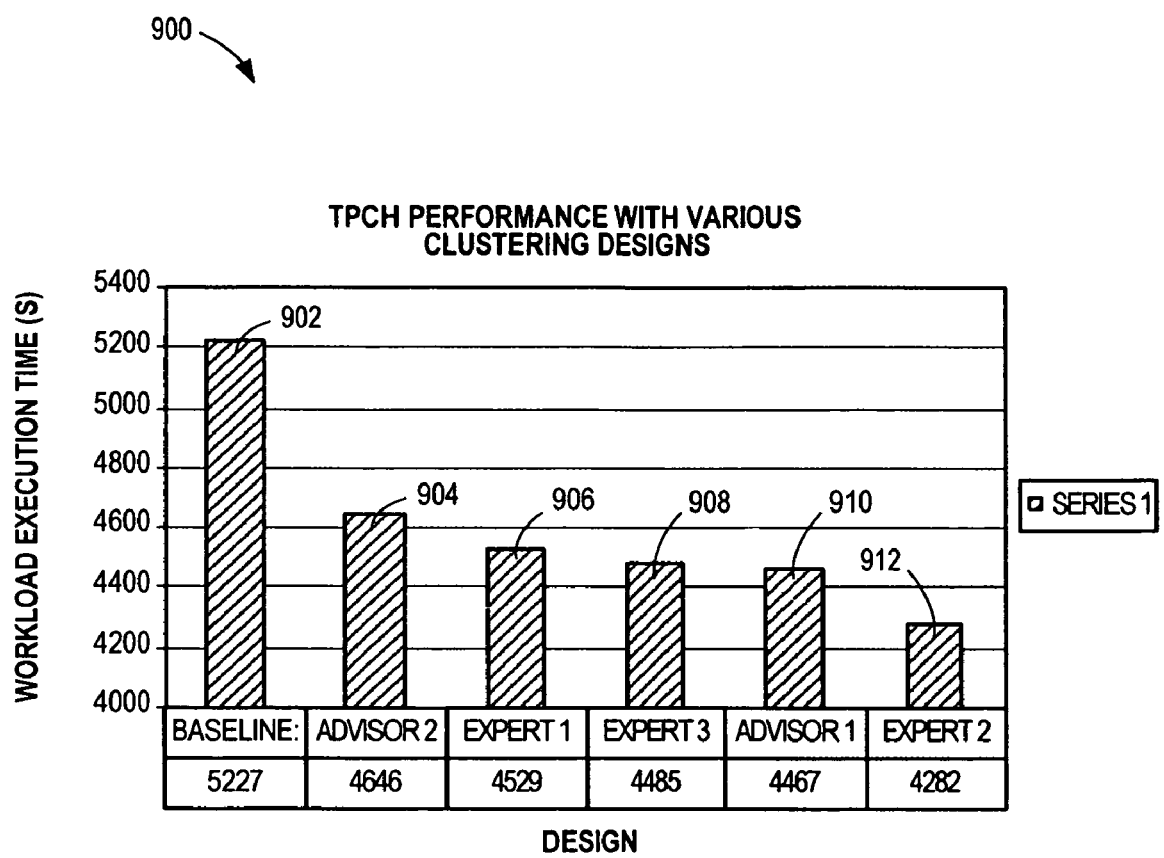
FIG. 9 is an illustrative bar graph showing relative improvements in workload execution time for various clustering designs, in comparison to a baseline.

FIG. 9 shows a bar graph 900 summarizing the experimental results with all five clustering designs, plus a baseline run 902. These performance results show the performance benefit of clustering and the effectiveness of the teachings of the present invention. In these experiments, all five of the MDC designs showed a significant benefit over the baseline throughput. Of the five MDC designs, the performance benefit in rank order was Advisor 2 (904) at a decrease in execution time of 11.12%, Expert 1 (906) at a decrease of 13.35%, Expert 3 (908) at a decrease of 14.20%, Advisor 1 (910) at a decrease of 14.54%, and Expert 2 (912) at a decrease of 18.08%. Significantly, Advisor 1 (910) which represents the best recommendation selected according to the teachings of the present invention, gave recommendations that were measurably better than Advisor 2 (904), and both Expert 1 (906) and Expert 3 (912).

Figure 10:
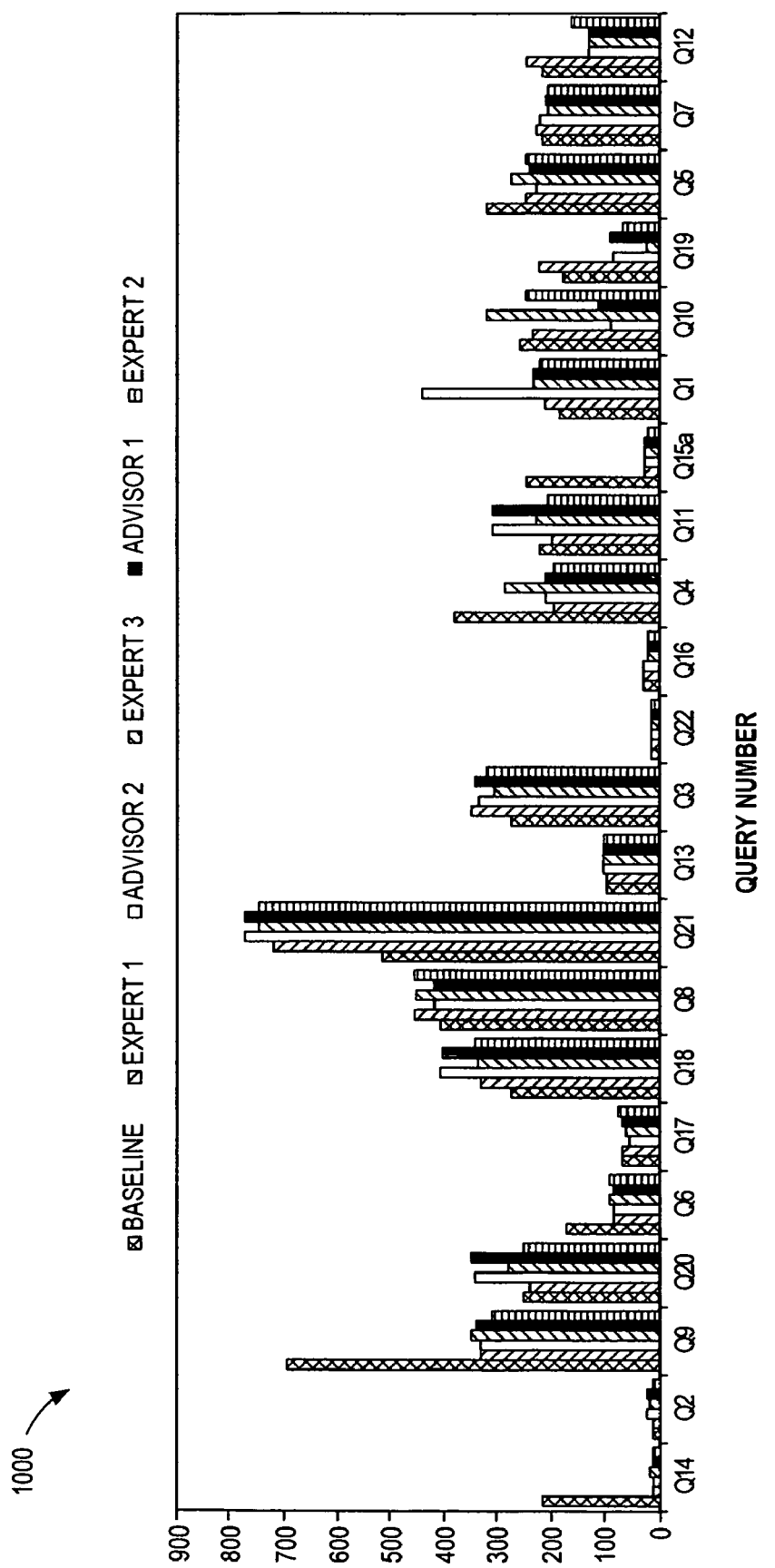
FIG. 10 is a multi-bar graph showing more detailed results of queries using various clustering designs, in comparison to a baseline.

Also revealing is a multi-bar graph 1000 of the performance by individual query as shown in FIG. 10. One of the interesting aspects of this illustration is that no single clustering design achieved performance gains across the entire workload. Rather, each clustering design gained on some queries at the expense of others. For example, the baseline run which had the worst overall performance had the best performance on queries 18, 13, 22, and 1. Expert 1, which was fifth in overall rank had the best query performance on queries 20, 4, 11. Expert 2which had the best overall performance had measurably slower results compared to other clustering designs on queries 3, 10, 5, and 12. This highlights the complexity of the search problem in the sense that the computational algorithm must consider the overall benefit of clustering designs across all tables and all queries.

While various illustrative embodiments of the invention have been described above, it will be appreciated by those skilled in the art that variations and modifications may be made. Thus, the scope of the invention is defined by the following claims.

What is claimed is:

1. A data processing system implemented method of directing a data processing system to improve execution efficiency of a database workload to be executed against a database, the database comprising database tables, the database workload identifying at least one of the database tables, the data processing system implemented method comprising:
identifying candidate database tables being identifiable in the database workload, the identified candidate database tables being eligible for organization under a clustering schema;
simulating database workload performance based on clustering data points along each of a plurality of candidate clustering dimensions at an estimated finest useful dimension granularity (FUDG) coarsification level;
selecting the identified candidate tables according to whether execution of the database workload is improved if the selected identified candidate table is organized according to the clustering schema; and
organizing the selected identified candidate tables according to the clustering schema prior to the database workload being executed against the database,
wherein the estimated finest useful dimension granularity (FUDG) coarsification level comprises estimating the point at which granularity resulting from coarsification is optimal such that any finer granularity results in storage expansion exceeding an acceptable amount.

2. The data processing system implemented method of claim 1 wherein the clustering schema comprises at least one of single-dimensional clustering schema and multi-dimensional clustering schema.

3. The data processing system implemented method of claim 1 wherein the selecting comprises:
simulating database workload performance based on clustering data points along each of a plurality of candidate clustering dimensions at one or more multiples of the estimated finest five useful dimension granularity (FUDG) coarsification level.

4. The data processing system implemented method of claim 3, further comprising:
determining the cardinality of each of the plurality of candidate clustering dimensions at the one or more multiples of the FUDG coarsification level.

5. The data processing system implemented method of claim 1 wherein the selecting comprises:
simulating database workload performance based on clustering data points along each of a plurality of candidate clustering dimensions at an estimated coarsification level;
selecting a plurality of coarsification levels; and
selecting candidate clustering dimension and coarsification combinations to generate a set of candidate clustering solutions.

6. The data processing system implemented method of claim 5 wherein the selecting further comprises:
searching the set of candidate clustering solutions to identify a candidate clustering dimension and coarsification combination providing the highest relative performance benefit without exceeding a specified storage expansion constraint.

7. The data processing system implemented method of claim 6, further comprising:
obtaining a baseline workload performance in the absence of clustering; and comparing the simulated workload performance to the baseline workload performance.

8. The data processing system implemented method of claim 5, further comprising: obtaining cardinality statistics from data points sampled for each candidate clustering dimension and coarsification combination.

9. The data processing system implemented method of claim 8, further comprising: ordering the set of candidate clustering solutions based on the cardinality statistics.

10. The data processing system implemented method of claim 5, further comprising:
sampling a subset of data points from the database as a sample space, such that analysis may be performed on the sample space in lieu of the database.

11. The data processing system implemented method of claim 10, further comprising:
adjusting the sampling size in dependence upon the number of clustering dimensions used.

12. The data processing system implemented method of claim 10, wherein analysis is performed repeatedly on the sample space in lieu of the database.

13. A data processing system for improving execution efficiency of a database workload to be executed against a database, the database comprising database tables, the database workload identifying at least one of the database tables, the data processing system comprising:
a memory storing modules; and
a processor executing the modules, the modules comprising:
an identification module for identifying candidate database tables being identifiable in the database workload, the identified candidate database tables being eligible for organization under a clustering schema;
a simulation module for simulating database workload performance based on clustering data points along each of a plurality of candidate clustering dimensions at an estimated finest useful dimension granularity (FUDG) coarsification level;
a selection module for selecting the identified candidate tables according to whether execution of the database workload is improved if the selected identified candidate table is organized according to the clustering schema; and
an organization module for organizing the selected identified candidate tables according to the clustering schema prior to the database workload being executed against the database,
wherein the estimated finest useful dimension granularity (FUDG) coarsification level comprises estimating the point at which granularity resulting from coarsification is optimal such that any finer granularity results in storage expansion exceeding an acceptable amount.

14. The data processing system of claim 13 wherein the clustering schema comprises at least one of single-dimensional clustering schema and multi-dimensional clustering schema.

15. The data processing system of claim 13 wherein the selection module comprises:
a simulating module for simulating database workload performance based on clustering data points along each of a plurality of candidate clustering dimensions at one or more multiples of the estimated finest useful dimension granularity (FUDG) coarsification level.

16. The data processing system method of claim 13 wherein the selection module comprises:
a simulation module for simulating database workload performance based on clustering data points along each of a plurality of candidate clustering dimensions at an estimated coarsification level;
a selecting module for selecting:
a plurality of coarsification levels; and
candidate clustering dimension and coarsification combinations to generate a set of candidate clustering solutions.

17. The data processing system of claim 16 wherein the selecting module comprises:
a search module for searching the set of candidate clustering solutions to identify a candidate clustering dimension and coarsification combination providing the highest relative performance benefit without exceeding a specified storage expansion constraint.

18. The data processing system of claim 17, further comprising:
an obtaining module for obtaining a baseline workload performance in the absence of clustering; and
a comparing module for comparing the simulated workload performance to the baseline workload performance.

19. The data processing system of claim 16, further comprising:
an obtaining module for obtaining cardinality statistics from data points sampled for each candidate clustering dimension and coarsification combination.

20. The data processing system of claim 19, further comprising:
an ordering module for ordering the set of candidate clustering solutions based on the cardinality statistics.

21. The data processing system of claim 16, further comprising: a sampling module for sampling a subset of data points from the database as a sample space, such that analysis may be performed on the sample space in lieu of the database.

22. The data processing system of claim 21, further comprising:
an adjustment module for adjusting the sampling size in dependence upon the number of clustering dimensions used.

23. The data processing system of claim 15, further comprising:
a determining module for determining the cardinality of each of the plurality of candidate clustering dimensions at the one or more multiples of the FUDG coarsification level.

24. An article of manufacture for directing a data processing system to improve execution efficiency of a database workload to be executed against a database, the database comprising database tables, the database workload identifying at least one of the database tables, the article of manufacture comprising:
a computer-readable medium embodying one or more instructions executable by the data processing system, the one or more instructions comprising:
data processing system executable instructions for identifying candidate database tables being identifiable in the database workload, the identified candidate database tables being eligible for organization under a clustering schema;
data processing system executable instructions for simulating database workload performance based on clustering data points along each of a plurality of candidate clustering dimensions at an estimated finest useful dimension granularity (FUDG) coarsification level;
data processing system executable instructions for selecting the identified candidate tables according to whether execution of the database workload is improved if the selected identified candidate table is organized according to the clustering schema; and
data processing system executable instructions for organizing the selected identified candidate tables according to the clustering schema prior to the database workload being executed against the database,
wherein the estimated finest useful dimension granularity (FUDG) coarsification level comprises estimating the point at which granularity resulting from coarsification is optimal such that any finer granularity results in storage expansion exceeding an acceptable amount.

25. The article of manufacture of claim 24 wherein the clustering schema comprises at least one of single-dimensional clustering schema and multi-dimensional clustering schema.

26. The article of manufacture of claim 24 wherein the data processing system executable instructions for selecting comprises:
data processing system executable instructions for simulating database workload performance based on clustering data points along each of a plurality of candidate clustering dimensions at one or more multiples of the estimated finest useful dimension granularity (FUDG) coarsification level.

27. The article of manufacture of claim 24 wherein the data processing system executable instructions for selecting comprises:
data processing system executable instructions for determining the cardinality of each of the plurality of candidate clustering dimensions at the one or more multiples of the FUDG coarsification level.

28. The article of manufacture of claim 24 wherein the data processing system executable instructions for selecting comprises:
data processing system executable instructions for simulating database workload performance based on clustering data points along each of a plurality of candidate clustering dimensions at an estimated coarsification level;
data processing system executable instructions for selecting a plurality of coarsification levels; and
data processing system executable instructions for selecting candidate clustering dimension and coarsification combinations to generate a set of candidate clustering solutions.

29. The article of manufacture of claim 28 wherein the data processing system executable instructions for selecting further comprises:
data processing system executable instructions for searching the set of candidate clustering solutions to identify a candidate clustering dimension and coarsification combination providing the highest relative performance benefit without exceeding a specified storage expansion constraint.

30. The article of manufacture of claim 29, further comprising:
data processing system executable instructions for obtaining a baseline workload performance in the absence of clustering; and
data processing system executable instructions for comparing the simulated workload performance to the baseline workload performance.

31. The article of manufacture of claim 28, further comprising:
data processing system executable instructions for obtaining cardinality statistics from data points sampled for each candidate clustering dimension and coarsification combination.

32. The article of manufacture of claim 31, further comprising:
data processing system executable instructions for ordering the set of candidate clustering solutions based on the cardinality statistics.

33. The article of manufacture of claim 28, further comprising:

data processing system executable instructions for sampling a subset of data points from the database as a sample space, such that analysis may be performed on the sample space in lieu of the database.

34. The article of manufacture of claim 33, further comprising:

data processing system executable instructions for adjusting the sampling size in dependence upon the number of clustering dimensions used.

* * * * *